United States Patent

[11] 3,616,951

[72] Inventors David L. St. Clari
 Wilmette;
 Martin Mueller, Glenview, both of Ill.
[21] Appl. No. 862,229
[22] Filed Sept. 30, 1969
[45] Patented Nov. 2, 1971
[73] Assignee Owens-Illinois, Inc.

[54] CARTON UNLOADING AND STACK
 TRANSFERRING APPARATUS
 26 Claims, 12 Drawing Figs.
[52] U.S. Cl. .................................................. 214/310,
 214/8.5 A
[51] Int. Cl. ........................................................ B65b 21/02
[50] Field of Search ............................................ 214/310,
 8.5

[56] References Cited
 UNITED STATES PATENTS
1,272,472 7/1918 Lohman ........................ 214/8.5 A
2,214,421 9/1940 Kneass, Jr. ..................... 214/8.5 A X
3,198,361 8/1965 Krupp ............................ 214/310

Primary Examiner—Gerald M. Forlenza
Assistant Examiner—John Mannix
Attorney—Dressler, Goldsmith, Clement & Gordon ABSTRACT: An apparatus for unloading stacks of containers from a carton and for transferring the stacks of containers to the sections of a hopper structure associated with a container filling machine. The apparatus includes a clamping structure for positively retaining the carton of containers and for placing the carton in slidable association on a frame above a stack elevator structure. The carton contains a plurality of layers of plural stacks with adjacent layers being separated by spacer sheets, and the apparatus includes means for removing the spacer sheets as the stacks of containers are lifted into position for movement down an inclined discharge ramp. The apparatus includes a transport mechanism for receiving stacks of containers from the discharge ramp and for transporting the stacks to a chute assembly. The transport means includes an inversion mechanism for dumping the stacks into the chute structure, and the chute structure is positioned to be moved into stack transferring relationship with respect to the sections of the hopper filling machine.

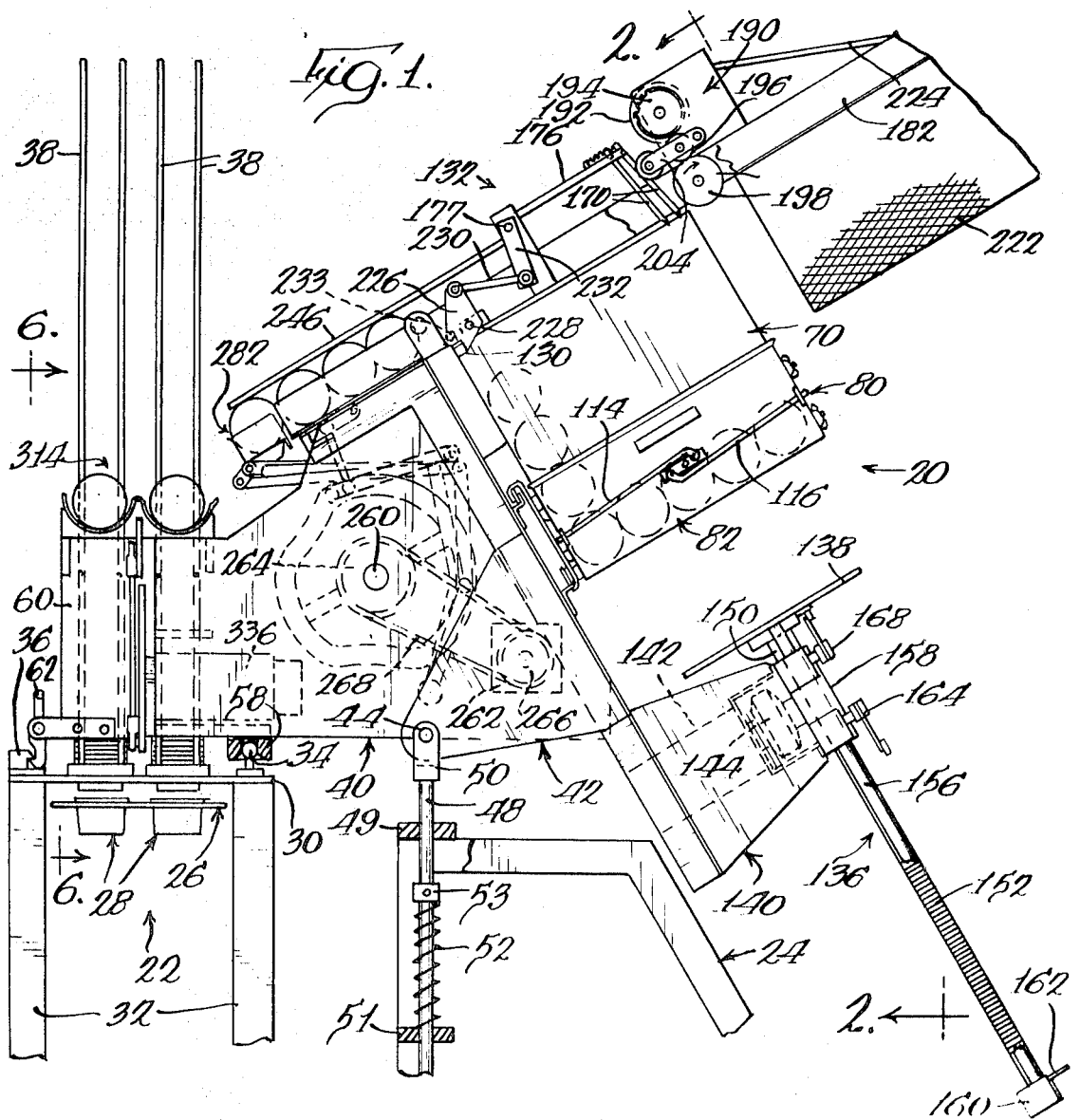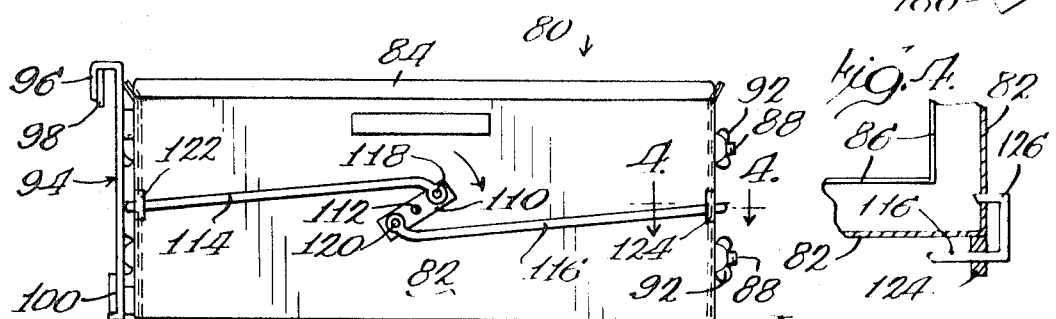

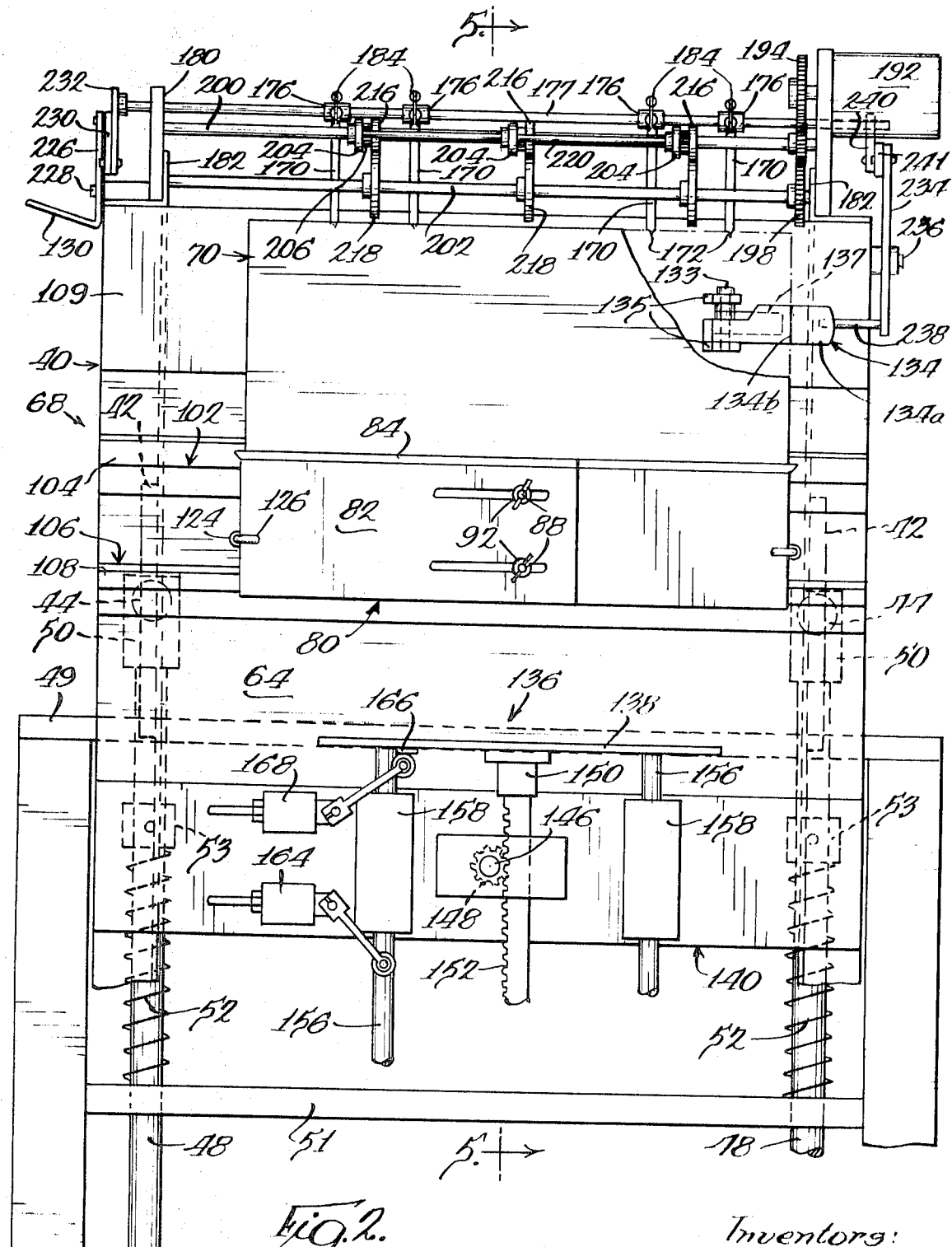

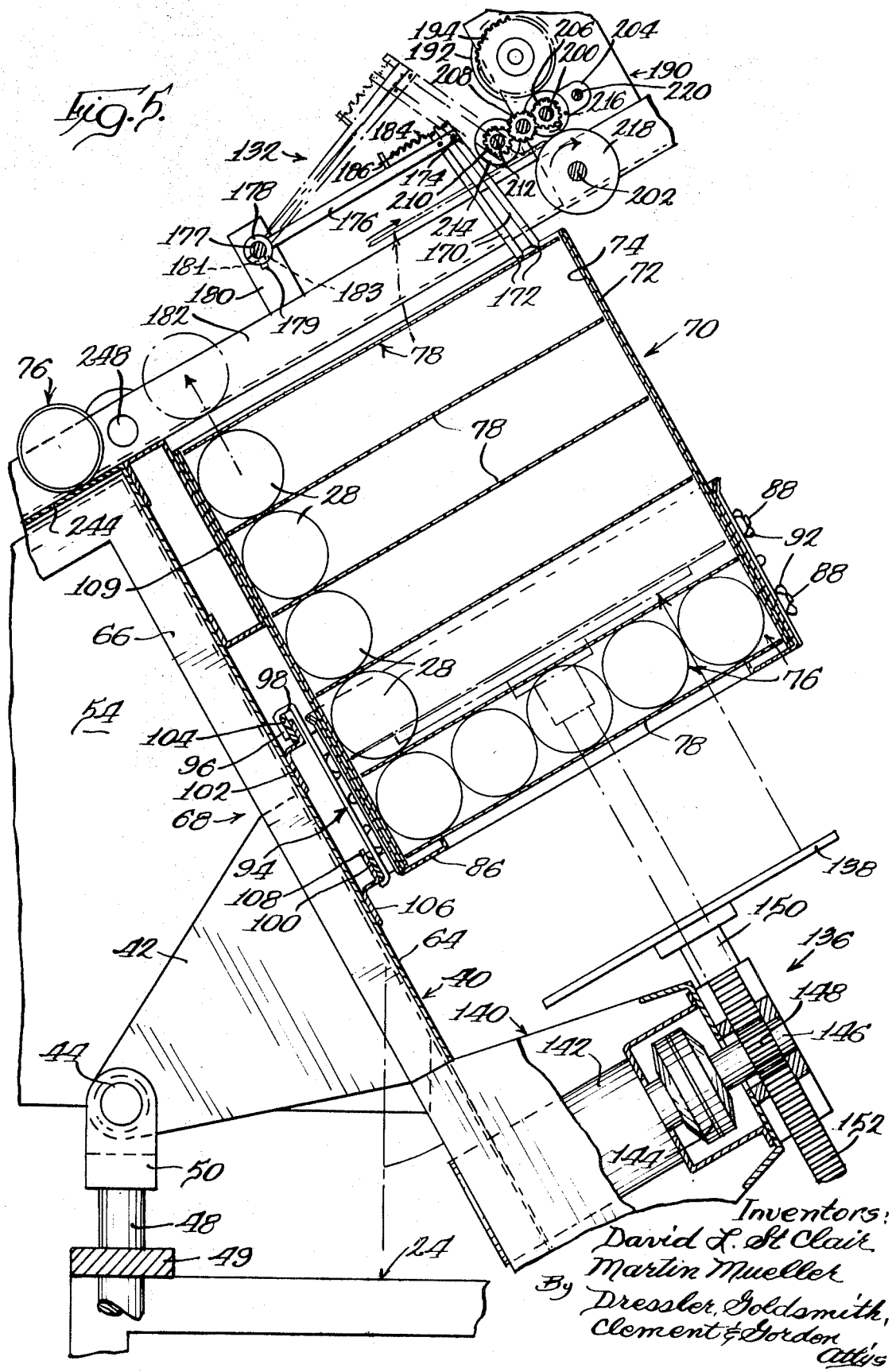

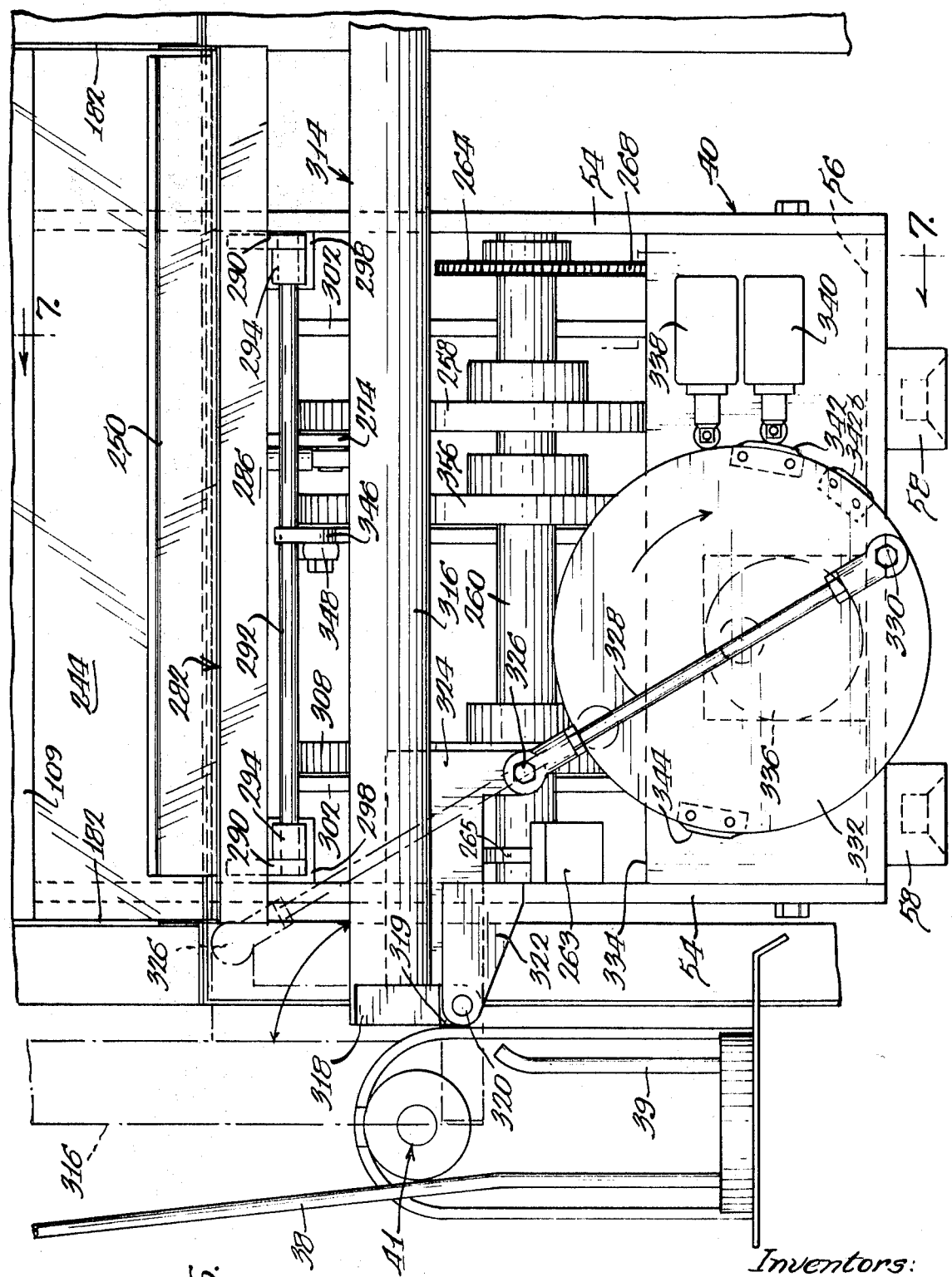

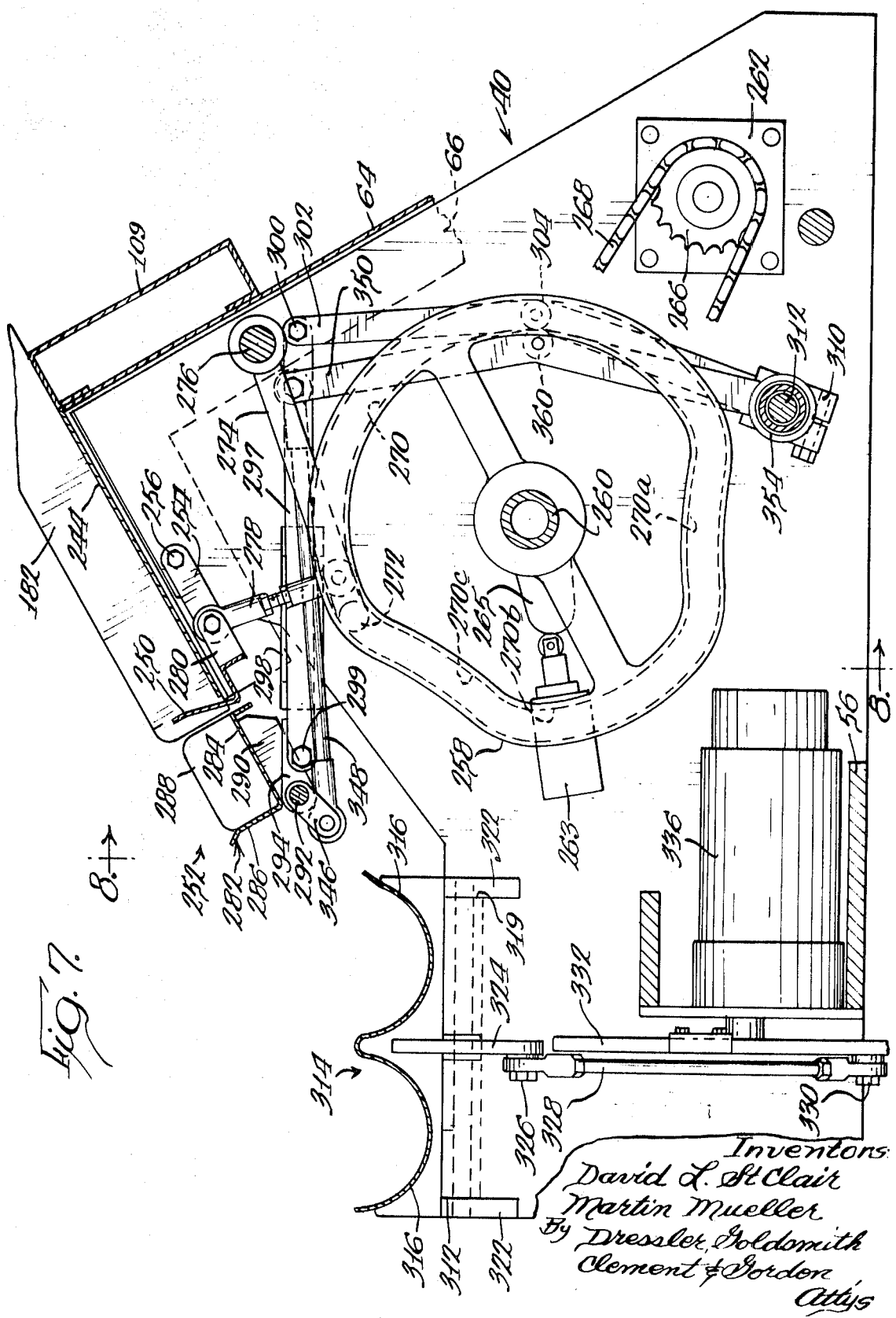

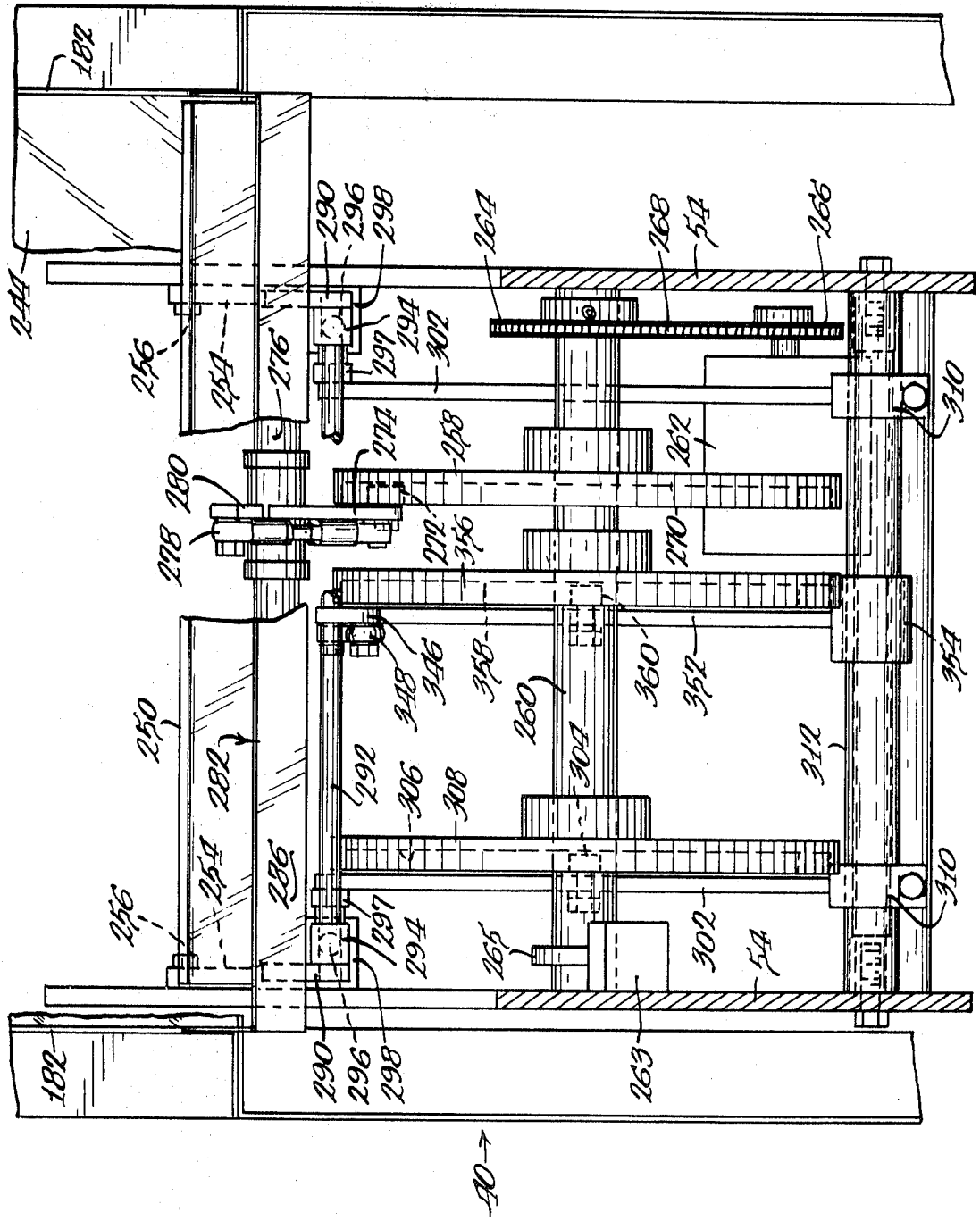

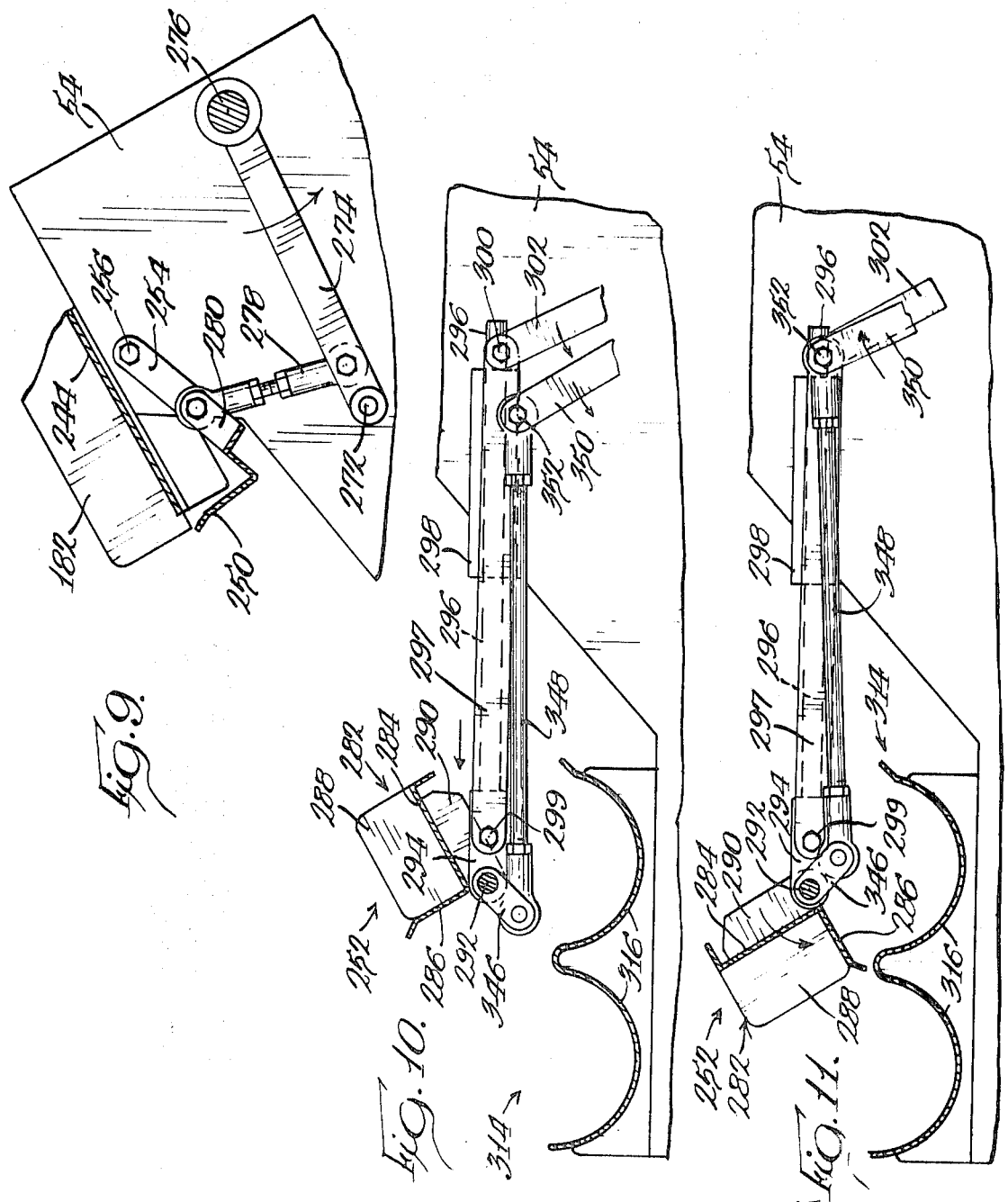

CARTON UNLOADING AND STACK TRANSFERRING APPARATUS

BACKGROUND OF THE INVENTION

The present invention relates to a container handling apparatus, and more particularly to an apparatus for handling containers in which comestibles are to be packaged.

One of the major problems in the comestible packaging art is to retain the containers in a sanitary condition. Heretofore, comestible containers have been manually placed within container dispensing hoppers associated with a filling machine, and the manual handling of the containers is not only a time consuming and troublesome task, but also increases the chances of contaminating the containers. To overcome the above problems, it has been proposed in the past to provide automated apparatus that would obviate the necessity of manually handling comestible containers; but heretofore, a satisfactory automated container handling apparatus that is compatible with present day high-speed filling machines has not been provided.

SUMMARY OF THE INVENTION

The apparatus of the present invention provides an arrangement for minimizing the amount of manual work that must be done to insure a continuous supply of containers for a high-speed container filling machine. The apparatus of the present invention has a particular utility in handling containers that are usable in comestible packaging machines, such as machines for dispensing ice cream into frustoconically shaped containers. Such containers are conventionally packaged in a carton having a plurality of layers of stacks in nested containers. The layers are separated by a spacer sheet to protect the individual containers The apparatus of the present invention is usable with a multiline packaging machine wherein a conveyor carries at least two side-by-side rows of containers to a filling station. Such filling machines conventionally include a container hopper above each conveyor row, with a magazine structure being provided for the hoppers for transferring containers one at a time from the bottom of the stacks within the hoppers onto the conveyor therebelow.

The apparatus of the present invention provides a novel arrangement for clamping a carton and for placing the clamped carton in slidable association with a stack discharge mechanism. The stack discharge mechanism includes an elevator that lifts the layers of stacks upwardly in the carton into position for movement of the uppermost layer of stacks down an inclined discharge ramp. A sheet removal mechanism is provided for automatically removing the spacer sheets between adjacent stack layers. A transport mechanism is provided for transferring stacks of containers from the discharge ramp to a chute structure, and the chute structure is located in a position to dispense the stacks of containers into the hopper sections associated with the filling machine.

The operation of the apparatus of the present invention is essentially automatic, and eliminates the necessity of manually handling the containers. A photocell monitors the hopper sections of the filling machine and creates a signal when the supply of containers drops below a preselected level for initiating a stack transfer cycle. The only manual labor that is required in connection with the apparatus of the present invention is to remove an empty carton and replace it with a filled carton, when necessary.

BRIEF DESCRIPTION OF THE DRAWINGS

FIG. 1 is an end elevational view of the carton unloading and stack transferring mechanism of the present invention;

FIG. 2 is an enlarged front elevational view taken generally along line 2—2 of FIG. 1;

FIG. 3 is an enlarged side elevational view of a carton clamping mechanism utilized in connection with the unloader of the present invention;

FIG. 4 is a fragmentary sectional view taken generally along line 4—4 of FIG. 1;

FIG. 5 is an enlarged sectional view through the carton unloading mechanism;

FIG. 6 is an enlarged rear elevational view taken generally along line 6—6 of FIG. 1;

FIG. 7 is a sectional view taken generally along line 7—7 of FIG. 6;

FIG. 8 is a sectional view taken generally along line 8—8 of FIG. 7;

FIG. 9 is a fragmentary sectional view illustrating the stack transferring mechanism in a first position;

FIG. 10 is a fragmentary sectional view similar to FIG. 9, and illustrating the stack transferring mechanism in a second position;

FIG. 11 is a fragmentary sectional view similar to FIGS. 9 and 10 and illustrating the stack transferring mechanism in a third position.

DESCRIPTION OF THE PREFERRED EMBODIMENT

Figure 12:
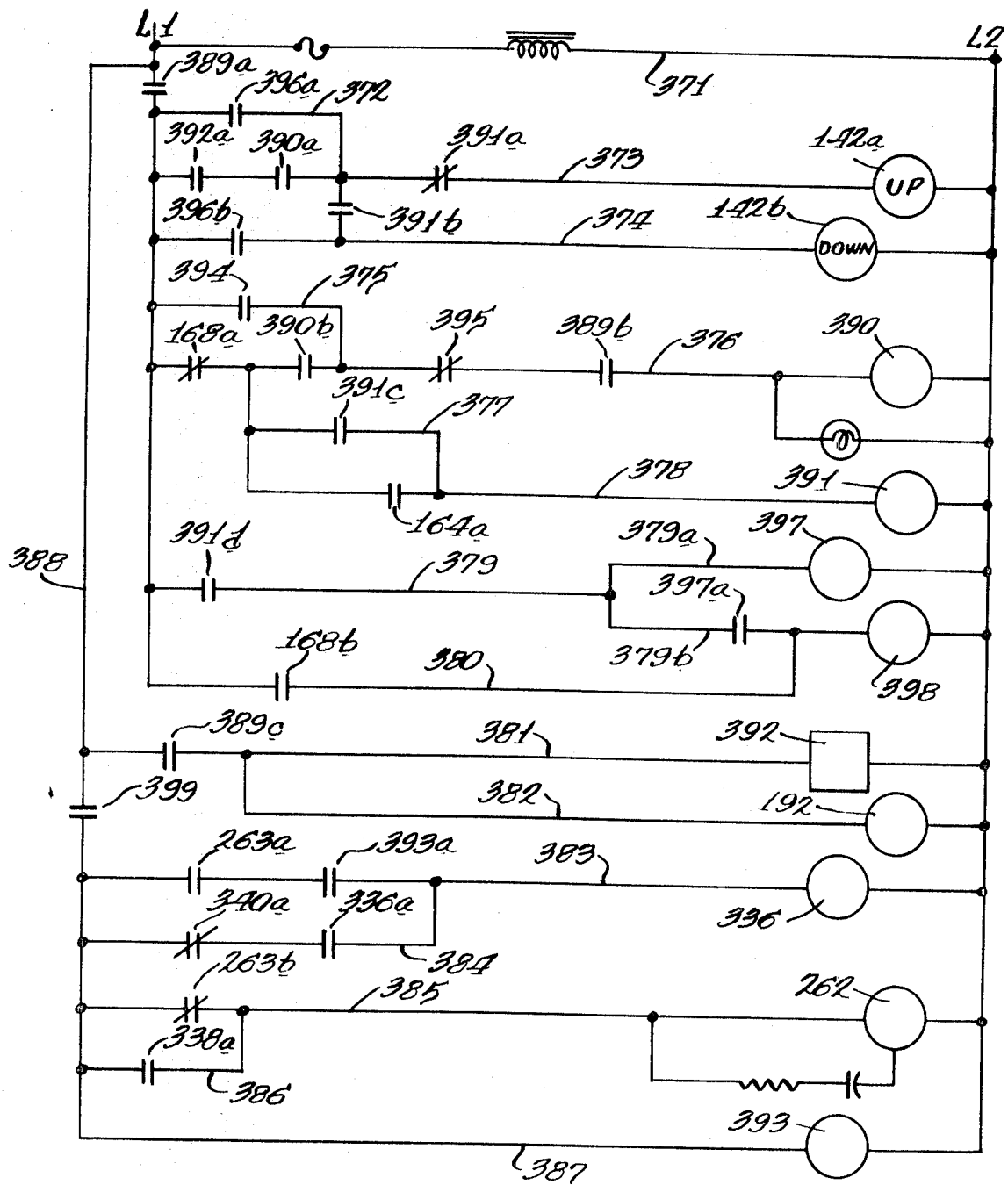
FIG. 12 is an electrical schematic diagram.

While this invention is susceptible of embodiment in many different forms, there is shown in the drawings and will herein be described in detail in a preferred embodiment of the invention, with the understanding that the present disclosure is to be considered as an exemplification of the principles of the invention and is not intended to limit the invention to the embodiment illustrated. The scope of the invention will be pointed out in the appended claims.

Referring now to the drawings in detail, the carton unloading and stack transferring mechanism of the present invention is illustrated generally at 20 in FIG. 1, and is used in conjunction with a container filling machine 22. The carton unloading and stack transferring mechanism 20 includes a base 24 that is mounted upon caster wheels (not shown) so that the machine 20 is portable and can be moved from one filling machine to another. The filling machine 22 illustrated herein is similar to that disclosed in Mueller U.S. Pat. No. 3,267,971, although it will be readily apparent from the ensuing description that the carton unloading and stack transferring machine 20 will have utility with many other different types of filling machines.

The filling machine 22 illustrated herein includes an endless conveyor 26 having two side-by-side rows of openings therein for receiving containers 28; and illustratively, the containers 28 may take the form of generally frustoconically shaped ice cream containers. The filling machine includes a horizontal bed 30 supported by upright rails 32, and attachment means is provided on the bed 30 for detachably coupling the carton unloading and stack transferring mechanism 20 to the filling machine 22. The attachment means includes a pair of longitudinally spaced upwardly extending balls 34 on one side of the bed 30 of the filling machine, with balls 34 cooperating with sockets to be hereafter described carried upon the unloading apparatus 20. A detent block 36 is provided on the opposite side of the bed 30 from balls 34, and cooperates with a pivotally mounted latch member on the unloading apparatus, also to be hereafter described.

The filling machine 22 further includes vertically extending hoppers 38, each of which is positioned in alignment with one of the rows of openings in the conveyor 26 for simultaneously discharging a container from the lower ends thereof into openings in the conveyor 26, as the conveyor 26 moves beneath the hoppers 38. Any suitable mechanism may be provided for simultaneously discharging the containers 28 from the hoppers 38. Hoppers 38 are each defined by a plurality of generally vertically extending rods, with the rods 39 at one side of the hoppers being relatively short, as is clear from FIG. 6. A photocell 41 monitors hoppers 38 for giving a signal when the supply of containers in the hoppers reaches a predetermined level.

The unloading mechanism 20 includes a frame 40 that has lugs 42 on opposite sides thereof that make a ball joint type of connection with a transversely extending shaft 44. Opposite ends of shafts 44 are fastened to upwardly extending guide rods 48 by connector members 50, and rods 48 are mounted for vertical sliding movement within spaced frame members 49 and 51 of carriage 24. Stabilizing springs 52 surrounding rods 48 and acting between frame member 51 and sleeves 53 on rods 48 counterbalance the unloading mechanism, when it is pivoted away from the filling machine. The mounting structure for the frame 40 that is provided by the guide rods 48 allows the frame 40 to be canted slightly relative to the filling machine 22, as might occur if the carriage 24 resets on an uneven floor.

Frame 40 is of generally open box construction, and includes somewhat triangularly shaped side plates 54 (FIG. 7), with a bottom plate 56 extending between side plate 54. Downwardly facing socket members 58 (FIGS. 1 and 6) are carried by bottom plate 56, and engage the upwardly extending balls 34 on the filling machine, when the unloading apparatus is pivoted about shaft 44 into the position of FIG. 1. An extension plate 60 (FIG. 1) extends outwardly from one of the side frame members 54, and carries a pivotally mounted latch member 62 that cooperates with detent member 36 to releasably hold the unloading apparatus in the proper position relative to the filling machine 22.

Frame 40 includes an upwardly extending front wall 64 that extends between sidewalls 54, and front wall 64 is secured to channels 66 that are bolted, or otherwise suitably secured, to sidewalls 54. Front wall 64 includes guide track means 68 for slidably accepting a carton 70, and before discussing the guide track means in detail, the carton and carton holding structure will be described. This structure can be seen in FIGS. 2–5.

The carton 70 (FIG. 5) is of essentially conventional construction, and includes upright walls 72 having an open rectangular sleeve or liner 74 therein. A plurality of individual containers 28 are nested together into a stack 76, and a plurality of stacks 76 (five in the illustrated embodiment) are provided in each layer within container 70. Each layer of stacks 76 is supported upon a rectangular sheet member 78 that is positioned perpendicularly with respect to the liner 74 of the carton 70, and the liner 74 serves to guide the support plates 78 and the stacks 76 as they are moved upwardly. A sheet 78 is also provided above the uppermost layer of containers in the carton. The carton 70 initially comes with closure flaps (not shown) at the upper and lower ends thereof, and the closure flaps are severed from the container before the container is placed within the carton holding and clamping mechanism 80.

The carton clamping mechanism 80 is of open box frame construction, and includes upright sidewalls 82 having outwardly flared upper ends 84 to facilitate placement of a carton within the holder 80. The walls 82 each have an inwardly extending flange 86 at the lower end thereof for supporting the lowermost sheet 78 within the carton 70. The holder 80 is preferably formed of two generally U-shaped sections that are slidably mounted relative to one another so that the holder 80 can accommodate cartons of different size. To this end, the sidewalls of the innermost U-shaped member may include the studs 88 extending through slots 90 in the sidewalls of the outermost U-shaped member. Clamping means, such as wing nuts 92, are threaded upon the studs 88 to hold the U-shaped members in the selected position of adjustment for the particular size of carton.

The clamping mechanism 80 includes means on one side thereof for slidably mounting the clamping mechanism 80 on the front wall 64 of the frame 40, and to this end, a pair of laterally spaced, identically shaped brackets 94 are secured to one sidewall 82 of the clamping mechanism. Brackets 94 each have a downwardly bent upper end 96 having a guide shoe 98 fixed thereto, and guide shoes 98 may be formed of a plastic bearing material, such as Nylon. An outwardly facing guide shoe 100 is provided at the lower end of each bracket 94, and guide shoes 100 may also be formed of a plastic bearing material such as Nylon.

The guide track means for accommodating the clamping mechanism includes an upper rail 102 and a lower rail 106. Upper rail 102 has an offset upper end 104, and the offset upper ends 96 of brackets 94 embrace rail portions 104 with the guide shoes 98 being positioned in sliding engagement with the facing surface thereof. The second guide rail 106 is secured to the front wall 64 of the frame 40 in parallelism with guide rail 102, and guide rail 106 includes an offset upper end 108 that is engaged by the guide shoes 100 at the lower end of the bracket 94. Carton support means is provided on wall 64 above rail 102 to stabilize the carton 70, and the support means is defined by a channel member having a carton support surface 109 disposed in parallelism with wall 64.

THe clamping means 80 includes means for positively retaining a carton therewithin; and to this end, links 110 are pivotally connected at their midportion at 112 to opposite sidewalls 82 of the clamping means. The bent end portions of further links 114 and 116 are pivotally connected at 118 and 120, respectively, to link 110 outwardly of pivot 112; and the outer ends of the links 114 and 116 are slidably mounted in lugs 122 and 124, respectively, that extends outwardly from the sidewalls of the clamping means 80. Each of the links 114 and 116 include reversely bent reentrant end portions 126 (FIG. 4) that are slidably mounted in openings of the sidewalls of the clamping means, with the end portions of link portions 126 being sharpened at 128. Thus, when the links 110 are pivoted in a clockwise direction, as viewed in FIG. 3, the links 114 and 116 both move inwardly relative to one another to move the sharpened end portions 128 inwardly to pierce the sidewalls 72 of the carton and the liner 74, so that the carton and liner are positively held by the clamping means 80.

Thus, in use, the bottom closure members are initially severed from the carton 70, and the U-shaped members of the clamping means are adjusted to the appropriate size for the carton 70. The wing nuts 92 are then tightened to retain the U-shaped members in place, and the carton 70 is positioned within the clamping means 80, with the open bottom facing downwardly, and with the lowermost supporting sheet 78 being positioned upon the inwardly extending flanges 86 of the sidewalls 82, as can be seen in FIG. 3. Links 110 are then pivoted to pierce the sidewalls of the carton and positively hold it within the clamping means. The uppermost closure members of the carton 70 are then severed from the sidewalls 72 thereof, and the carton is slidably positioned upon the front wall 64 of the frame 40 by placing the guide members 98 and 100 in slidable engagement with the rails 102 and 106. As the clamping mechanism 80 is moved along rails 102 and 106 from left to right toward the position of FIG. 2, the upper end of the carton 70 engages an abutment 130 that is associated with a sheet feeding mechanism 132 (to be hereinafter described) to pivot a portion of the sheet feeding mechanism to a clearance position as the carton 70 moves therepast. A stop 134 is positioned to engage the leading edge of the carton 70 to positively locate the carton in proper position above an elevator mechanism 136. Stop 134 is mounted for pivotal movement upon a pin 133 that extend between brackets 135 which project outwardly from frame wall 64. Stop 134 has an offset end 134a that provides an upright stop surface 134b. A leaf spring 137 biases the stop 134 outwardly away from the wall 64, and positions surface 134b to be engaged by the leading edge of the carton 70. When it is desired to place a further carton on the unloading mechanism, stop 134 is pivoted against the bias of spring 137 to move the surface 134b to a clearance position so that the carton can be moved to the right as viewed in FIG. 2. Movement of member 134 also moves a portion of the sheet feeding mechanism to a clearance position, as will hereafter appear.

The elevator mechanism 136 includes an ejector member in the form of a flat platform 138 that is mounted for movement in a path parallel to the front wall 64 of the frame 40. Platform member 138 has a size such that it will pass between the flanges 86 of the carton clamping mechanism 80, and as the platform member moves upwardly, it engages the lowermost sheet 78 in the carton 70 to shift the layers of stacks 76 of containers 28 within the carton upwardly relative to the clamping member 80 and the frame 40. The platform assembly 136 is supported upon a subframe 140 (FIGS. 1, 2 and 5) that is secured to the front wall 64 of the frame 40 adjacent the lower end thereof. A drive motor 142 is supported by subframe 140, and is connected by a coupling 144 to a stub shaft 146 having a pinion 148 thereon. Platform member 138 is carried by a column 150 having a rack 152 formed integrally therewith, and pinion 148 is positioned in driving engagement with rack 152 for raising and lowering the platform member 138. Platform member 148 is guided in its movement relative to the carton holding mechanism 80 by a pair of spaced guide rods 156 that are slidably mounted within sleeves 158 that are secured to the front wall of the subframe 140. The lowermost ends of guide rods 156 and of column 150 are connected to a carrier shoe 160 (FIG. 1), and a switch actuator 162 extends outwardly from shoe 160 for engagement with the actuator of a switch 164 when the platform assembly is in the uppermost position. A further switch 168 is mounted on subframe 140 in a position to be actuated by the bottom of platform member 138 when the platform member is in the lowermost position illustrated in FIGS. 1 and 2.

Thus, when motor 142 is energized, the engagement of pinion 148 with rack 152 drives platform member 138 upwardly, and as the platform member 138 initially moves upwardly, it moves out of engagement with switch 168. As the platform member 138 continues its upper movement into engagement with the lowermost sheet 78 in the carton 70, the uppermost sheet 78 is lifted into engagement with a sheet feeding mechanism 132. At the end of the stroke of rack 152, when all of the sheets 78 and stacks 76 of containers have been removed from the carton 70, switch 164 is actuated to deenergize motor 142 and terminate movement of rack 152.

The sheet feeding mechanism 132 includes a plurality of downwardly extending fingers 170, each having a sharply pointed lower end 172 that is adapted to bear against, and dig into, the uppermost sheet 78. Fingers 170 are pivotally connected at 174 to support arms 176, which in turn are mounted for limited pivotal movement on a shaft 177 that extends through openings in brackets 180 which extend upwardly from the flanges 182 of an inclined ramp or slideway for the stacks of nested containers 28. Support arms 176 include sleeves 178 that embrace shift 177, and sleeves 178 have an axially extending slot 179 (FIG. 5) therein which makes sliding engagement over a pin 181 that extends radially outwardly from shaft 177. Sleeves 178 also include a partially circumferentially extending slot 183 which communicates with slot 178. Slots 183 are positioned in alignment with pins 179, and allow the arms to pivot relative to the shaft 177, with one end of the slots providing a stop to lift the fingers 170 to a clearance position, as will hereinafter appear. Springs 184 are connected between supports 186 that extend upwardly from arms 176, and the uppermost end of fingers 170 to bias the fingers 170 in a counterclockwise direction about pivots 174 (as viewed in FIG. 5) to constantly urge the uppermost sheet 78 forwardly, or to the right as the elevator mechanism 136 moves upwardly. As the ejector member 138 lifts the layers of stacks in carton 70, arms 176 pivot about cross shaft 177, and the fingers 170 move from the full to the broken line position of FIG. 5 to shift the uppermost sheet 78 to the right into a sheet removal mechanism 190.

The sheet removal mechanism is driven by a motor 192 which is mounted upon a plate 193 that is secured to the upright flange 182 at one side of the inclined stack discharge ramp. The output shaft of motor 192 is coupled to a first pinion 194 that in turn drives pinions 196 and 198. Pinions 196 and 198 are coupled to shafts 200 and 202, respectively. The sheet removal mechanism 190 further includes a plurality of arms 204 that are pivotally mounted on shaft 200, with arms 204 being essentially equally spaced along shaft 200, as can be best seen in FIG. 2. A set of three gears 206, 208 and 210 are rotatably mounted on each arm 204, with gears 206 being driven by shaft 200, and with each gear 208 transmitting rotary motion from gear 206 to gear 210. Gears 210 are rotatable with shafts 212, and a sheet engaging roller 214 is mounted on each of shaft 212 to be rotated by one of gears 210. A further roller 216 is mounted upon each shaft 200 adjacent one of gears 206, and is positioned above a still further roller 218 that is driven by shaft 202. A stabilizing rod 220 extends between the ends of arms 204 on the opposite side of shaft 200 from gears 208 and 210. From the above it will be apparent that rollers 214, 216 and 218 are continuously driven, with rollers 214 and 216 being rotated in a counterclockwise direction, and with rollers 218 being rotated in a clockwise direction.

In use, as the layers of stacks 76 are moved upwardly by the elevator mechanism 136, the fingers 170 function to shift the uppermost sheet 78 outwardly into the sheet removal mechanism 190. As the uppermost sheet 78 is being moved upwardly and outwardly, it moves into engagement with the continuously rotating rollers 214, which strips the uppermost sheet from the fingers 170 and gives the sheet further forward impetus toward the rollers 216 and 218. Since the arms 204 are pivoted upon shaft 200, the arms 204 will pivot somewhat in a clockwise direction as the uppermost sheet 78 initially engages rollers 214. After the uppermost sheet has been stripped from the fingers 170 and given further forward impetus rollers 214, it will move into engagement with rollers 216 and 218 which pinch the sheet and move it rapidly toward a sheet storage tray 222 (FIG. 1). An inclined deflector 224 may be positioned above tray 222 for deflecting the sheets 78 downwardly into the tray as they emerge from the sheet removal mechanism 190.

As has been previously mentioned, when the carton 70 is initially moved along the track means 68, the upper end of the carton engages an abutment 130. Abutment 130 is a portion of a lever 226 that is pivotally mounted at 228. A link 232 has one end fixed to shaft 177, and the other end of link 232 is connected to lever 226 through a further link 230. Thus, when a carton 70 moves into engagement with abutment 130, lever 226 is pivoted in a clockwise direction (FIG. 1) about pivot 228, and links 230 and 232 pivot shaft 177 in a counterclockwise direction to move pins 179 into engagement with one end of slots 183 to rock arms 176 upwardly and move fingers 170 to a clearance position spaced above the carton. After the trailing end of the carton 70 passes the abutment 130, arms 176 will fall by gravity, and a stop pin 233 that extends laterally outwardly from lever 226 locates the structure in the full line position of FIG. 5 in proper disposition to engage the uppermost sheet 78 in the carton 70 as the elevator member 138 moves upwardly.

When it is desired to position a further carton 70 on the unloading apparatus, stop 134 is pivoted against the bias of spring 137, as is previously described. A lever 234 is pivotally mounted at 236, and includes an abutment 238 at one end thereof that is positioned in the path of movement of the offset end 134a of stop 134. The end of lever 234 opposite from abutment 238 is connected to shaft 177 by a link 240 and 241, so that as lever 234 is pivoted by stop 134, shaft 177 is rocked to lift the fingers 170 to a clearance position spaced above the top of the carton. When the carton is moved to the right (FIG. 2) in front of stop 134 during the removal operation, stop 134 retains the fingers 170 in the clearance position. After the trailing edge of the carton passes the stop 134, spring 137 will bias the stop 134 outwardly away from wall 64, and the fingers 170 will fall by gravity into the full line position of FIG. 5.

Frame 40 includes a downwardly inclined wall 244 adjacent the discharge end of carton 70 for receiving the stacks 78 of the containers as the elevator mechanism 136 moves upwardly. In illustrative embodiment, wall 244 is positioned at a 30° angle with respect to the horizontal, with frame wall 64 being perpendicular to wall 244. The upwardly extending flanges 182 at the opposite sides of the wall 244 cooperate therewith to define a downwardly inclined stack discharge ramp, and a further frame member 246 (FIG. 1) may be positioned in parallelism with member 244 to positively retain the container stacks on the discharge ramp. Means may be provided for adjusting flanges 182 outwardly and inwardly to accommodate cartons of different size, although the flanges 182 are preferably spaced apart by a distance sufficient to accommodate stacks of maximum length. In operation, all of the container stacks 78 in a layer if stacks move down the inclined discharge ramp before the trailing end of the uppermost sheet 78 clears the fingers 170, so that the fingers 170 do not interfere with movement of the stacks down the discharge ramp. A photoelectric cell 248 monitors the uppermost end of the discharge ramp to insure that a supply of stacks is present on the discharge ramp and to terminate upward movement of the elevator mechanism 136 when the stacks are present, as will hereafter appear.

A stop member 250 (FIGS. 6–9) is positioned adjacent the lower end of the stack discharge ramp, and the stop member 250 functions to initially arrest movement of the stacks of containers down the discharge ramp, and to subsequently allow the stacks to move one at a time into a stack dumping mechanism 252. Stop member 250 includes integral forwardly and upwardly extending arms 254 at opposite ends thereof that are pivotally connected to side frame members 54 at 256. Stop 250 is pivoted from the stack stopping position of FIG. 7 to the stack transfer position of FIG. 9 by a cam operated linkage mechanism best seen in FIGS. 7 and 8.

The cam mechanism for stop 250 includes a cam 258 that is mounted for rotation with a shaft 260 which is journaled between side frame members 54. Shaft 260 is rotated by a drive motor 262 and a chain drive including a sprocket 264 on shaft 260, a sprocket 266 on the output shaft of motor 262, and an endless chain 268. Motor 262 is controlled by a switch 263 (FIGS. 7) that is actuated by a lobe 265 on shaft 260. Cam 258 includes an internal cam track 270, and a cam follower roller 272 rides in track 270. Cam follower roller 272 is provided at one end of an arm 274 that is pivotally mounted on a shaft 276 that extends transversely between side frame members 54. An adjustable link 278 is connected between arm 274 and an integral arm 280 on stop member 250 for pivoting the stop member 250 when the cam follower 272 engages the cam track portions 270a, 270b and 270c. As is evident from FIG. 7, cam track portions 270a and 270c are offset radially inwardly from cam portion 270b, so that as much as the cam portion 270a and 270c engage the follower 272, the arm 274 is pivoted in a counterclockwise direction about pivot 276 to move the stop 250 from the stack blocking position of FIG. 7 to the stack transfer position of FIG. 9.

The dumping mechanism 252 includes a tray 282 for receiving a stack of nested containers from the discharge ramp defined between flanges 182. Tray 282 includes a wall 284, an upstanding front wall 286, an upstanding sidewall 288. Flanges 290 extend downwardly from the bottom wall 284 adjacent the opposite ends of the tray 282, and a pivot shaft 292 extends between flanges 290. A pair of longitudinally extending arms 296 are connected to shaft 292 adjacent flanges 290 by links 294, and the intermediate portion of arms 296 are slidably mounted in guide blocks 298. Actuating arms 297 are pivotally connected adjacent one end at 300 to cam follower arms 302 and adjacent the opposite end at 299 to links 294. One arm 302 has a cam follower roller 304 at the midportion thereof that rides in an internal track 306 in a cam 308 that is mounted for rotation with shaft 260. Sleeves 310 are provided at the lower end of arms 302, and are pivotally mounted on a shaft 312 that extends transversely between sidewalls 54. Cam track 306 has a contour that is shaped to move the tray 282 from the stack receiving position of FIG. 7 to dumping positions, such as that shown in FIGS. 10 and 11, for dumping stacks of containers into a chute assembly 314.

The chute assembly 314 is preferably formed of sheet stock, and includes two side-by-side generally semicylindrical stack receiving section 316. A pivot block 318 (FIG. 7) is provided at one end of the chute assembly and block 318 includes inwardly offset portions 319 at the lower end thereof that are pivotally connected at 320 to support members 322 which are connected to one of frame members 54. A central arm 324 extends downwardly from the chute assembly 314, and is pivotally connected at 326 to the upper end of an actuating arm 328. The opposite end of actuating arm 328 is pivotally connected at 330 to an actuating disk 332 that is rotatably mounted on a frame member 334. Disk 332 is driven by a motor 336 that is mounted upon frame member 56, and motor 336 is controlled by switches 338 and 340 that are mounted upon frame member 334 in a position to be engaged by cam actuators 342 and 344 on disk 332. As is evident from FIG. 6, when disk 332 is rotated 180° in a clockwise direction from the full line position, the chute assembly 314 will be pivoted from the full line position to the broken line position to dump the side-by-side stacks of containers in chute sections 316 into the side-by-side hopper sections 38. An additional 180° rotation of disk 332 will return the chute assembly 314 from the broken line position to the full line position of FIG. 6 to receive additional stacks from the dumping mechanism 252.

The dumping mechanism 252 includes means for inverting the tray 282 to dispense a stack of containers into each of the chute sections 316. The inversion mechanism includes a link 346 that is fixed at one end to shaft 292, and which is pivotally connected at its opposite end to pivot rod 348. The end of pivot rod 348 remote from link 346 is pivotally connected at 352 to the upper end of a follower arm 350, and the lower end of follower arm 352 includes a sleeve 354 that is pivotally mounted upon shaft 312. A cam 356 on shaft 260 controls movement of the arm 352, and to this end, a follower roller 360 at the midportion of arm 352 rides in an arcuate cam track 358 in can 356.

Cam track 306 is shaped such as to initially move the tray 282 from the stack receiving position of FIG. 7 to a first stack dumping position illustrated in FIG. 10 for dumping a stack of containers into the left-hand chute section 316. The cam profile of track 358 is shaped such that when the tray 282 reaches the position of FIG. 10, arm 350 is pivoted in a clockwise direction from the position of FIG. 10 to the position of FIG. 11 to invert the tray 282 and dump the stack of containers from the tray into the left-hand chute section 316. Cam track 306 then pivots arm 302 in a clockwise direction to return the tray 282 to the stack receiving position of FIG. 7, whereupon arm 274 is pivoted by cam 270 to shift stop 250 downwardly and allow a further stack of containers to move into tray 282. Cam track 306 then pivots arm 302 in a counterclockwise direction to position tray 282 in a location to dump the stack in the right-hand chute section 316, whereupon cam track 358 pivots arm 350 in a clockwise direction to dump the contents of the tray 282 into the right-hand chute section 316. Cam 308 then returns the tray 282 to the stack receiving position of FIG. 7. After both the chute sections 316 have a stack of containers therein, disk 332 pivots the chute assembly 314 to the broken line position of FIG. 6, and the stacks of containers are free to slide out of the open end of the chute sections 316 into the hopper sections 38.

A control circuit for the above described structure is schematically illustrated in FIG. 12. The control circuit includes main power lines L1 and L2, and branch lines 371–388. A selector switch 389 is provided for selecting either manual or automatic operation, and selector switch 389 includes normally open contacts 389a in line L1, normally open contacts 389b in line 376, and normally open contacts 389c in line 381. It will be understood that when the automatic mode of operation has been selected, contacts 389a, 389b and 389c are closed. A main control relay 390 is connected in line 376 and relay 390 has normally open contacts 390a in line 373 and normally open contacts 390b in line 376. A second control relay 391 is connected in line 378, and relay 391 includes normally closed contacts 391a in line 373, normally open contacts 391b in line 372, normally open contacts 391c in line 377, and normally open contacts 391d in line 379. A third relay 392 is connected in line 381 and is energized in response to actuation of photocell 248. Relay 392 includes normally open contacts 392a in line 373 and normally closed contacts 392b in line 378. A fourth relay 393 is connected in line 387, and relay 393 includes normally open contacts 393a in line 383. Relay 393 is energized in response to actuation of photocell 41. Motors 192, 262, and 336 are connected in lines 382, 385 and 383, respectively. Mechanically interlocked relays 142a and 142b in lines 373 and 374, respectively control up and down movement of the elevator assembly by motor 142. A normally open start pushbutton switch 394 is connected in line 375, and a normally closed stop pushbutton switch 395 is connected in line 376.

An up-down selector switch 396 includes normally open contacts 396a in line 372 and normally open contacts 396b in line 374. Switch 168 includes normally closed contacts 168a in line 376, and normally open contacts 168b in line 380. Switch 164 includes normally open contacts 164a in line 378. Switch 263 includes normally open contacts 263a in line 383, and normally closed contacts 263b in line 385. Switch 340 includes normally closed contacts 340a in line 384, and switch 338 includes normally open contacts 338a in line 386. Indicator means in the from of a bulb 398 is connected in line 379b and a flasher 397 for the bulb 398 is connected in line 379a with flasher 397 having normally open contacts 397a in line 379b. A master on-off switch 399 is connected in line 388.

In use, the on-off switch 399 is initially closed, and the manual-automatic switch 389 is moved to the automatic position to close contacts 389a, 389b and 389c. The closing of contacts 389c completes a circuit to the sheet removal motor 192, which remains energized during automatic operation. If the elevator member 138 is initially in the uppermost position, switch 164 is actuated and relay 391 is energized through contacts 168a, 392b and 164a to close contacts 391d and complete a circuit to flasher 397. This closes contacts 397 in line 379b and bulb 398 flashes an indication to the operator to load another carton in the machine. If the elevator member 136 is initially in the down position, switch 168 is actuated and a circuit is complete to the bulb 398 through contacts 168b in line 380 to indicate to the operator to load another carton on the machine.

After a carton has been loaded on the machine and moved into alignment with the elevator assembly, the start switch 394 is momentarily closed to energize the relay 390 through switch 395 and contacts 389b in line 376. When relay 390 is energized contacts 390b in line 376 are closed to complete a holding circuit to relay 390 when switch 394 is opened. Motor 142 is energized to move the elevator member 138 upwardly and there are no stacks on the discharge ramp, so that a circuit is completed to the motor 142 through contacts 392a, 390a, 391a and through the contacts of relay 142a. After the uppermost sheet 78 has been removed, and the uppermost layer of stacks of containers begins to move down the discharge ramp, photocell 248 is actuated to energize relay 392 and open contacts 392a in line 373 to deenergize motor 142 and terminate movement of the elevator member 138, it being understood that as long as there are not stacks in the discharge ramp, motor 142 will remain energized to shift the elevator assembly upwardly.

When the supply of containers in hoppers 38 reaches a predetermined level as sensed by photocell 41, relay 393 is energized to close contacts 393a in line 383.

With shaft 260 in the rest position, switch 263 is actuated by ramp 265, and the contacts 263a in line 383 are closed, with the contacts 263b in line 385 being open. Thus, when relay 393 is energized, a circuit is completed to motor 336 through contacts 393a and contacts 263a. When disk 332 begins to rotate in a clockwise direction from the position of FIG. 6, can 342 moves out of engagement with switch 340 and switch contacts 340a in line 384 close to complete a holding circuit to the motor 336 through the contacts 336a of the motor starter coil. If stacks of containers are present in the chute assembly 316, as the motor 336 drives the disk 332, the contents of the chute assembly will be deposited into the hoppers 38 and relay 393 will be deenergized when photocell 41 is blocked to open contacts 393a. Closed contacts 263a and 393a retain motor 336 energized until the cam 342b moves into engagement with switch 338. As disk 332 completes approximately 180° of rotation, cam 342b moves into engagement with switch 338 to close contacts 338a in line 386 and complete a circuit to motor 262. When motor 262 is actuated, shaft 260 is rotated and a dumping sequence is initiated so that stacks of containers are transferred to each of the chute sections 316 in the manner previously described. As cam shaft 260 begins to rotate, lobe 265 moves out of engagement with switch 263 to open the contacts 263a in line 383 and to close the contacts 263b in line 385. Contacts 263b retain the motor 262 energized when cam 342b moves out of engagement with switch 338 and cam 344 moves into engagement with switch 340. When cam 344 moves into engagement with switch 340, contacts 340a in line 384 are opened to interrupt the circuit to the motor 336. The above sequence is repeated until all of the layers of stacks of containers have been discharged from carton 70.

When the elevator assembly 136 reaches the top of its stroke after having ejected the last layer of stacks from the carton 70, switch 164 is actuated to close the contacts 164a in line 378 to energize relay 391. When relay 391 is energized, contacts 391c in line 377 are closed to complete a holding circuit for relay 391 which contains the relay energized until switch contacts 168a in line 376 are opened. When relay 391 is energized, contacts 391a in line 373 are opened to allow motor 142 to rotate in a direction to move the elevator assembly 136 downwardly. Contacts 391b in line 373 are closed when relay 391 is energized to complete a circuit to the motor 142 through the contacts of relay 142b, so that motor 142 is rotated in a direction to move the elevator assembly 136 downwardly. When the elevator assembly reaches the lowermost position, switch 168 is actuated to open contacts 168a and deenergizes relay 391. A new carton may then be placed on the machine in the manner described above.

What we claim is:

1. Carton unloading apparatus comprising: frame means; means for supporting a carton on said frame means adjacent a carton discharge station, said carton having an open top and an open bottom with a plurality of layers of articles being positioned between said top and bottom, said frame means including an inclined ramp at said discharge station for receiving layers if articles successively discharged from said carton; said frame means further including an inclined wall that is positioned generally perpendicularly with respect to said ramp; said carton supporting means including carton clamping means and means for mounting said clamping means on said inclined wall; elevator means mounted on said frame means adjacent said discharge station, said elevator means including an ejector member that is movable through the open bottom of said carton and into engagement with the lowermost layer of articles in said carton upon actuation of said elevator means; means for sensing demand for articles, said sensing means being positioned to monitor the articles on said ramp; and means responsive to said sensing means for actuating said elevator means to move said ejector member into engagement with the lowermost layer of articles to shift all of the layers of articles upwardly in said carton and to move the uppermost layer of articles outwardly of said carton through said open top.

2. Carton unloading apparatus as set forth in claim 1, in which the means on said inclined wall for mounting said clamping means includes first and second parallel tracks, and wherein said carton supporting means further includes follower means on said carton clamping means for engaging said tracks.

3. Carton unloading apparatus as set forth in claim 1, in which said carton clamping means includes wall means collectively defining a frame having an open upper end for receiving a carton therein, support means extending inwardly adjacent the lower end of said wall means for retaining the open bottom of said carton, said support means having a clearance opening therein for allowing said ejector member to move therethrough and into engagement with the articles in the carton.

4. Carton unloading apparatus as set forth in claim 3, wherein at least one carton piercing member is mounted for movement inwardly of said wall means for piercing the wall of the carton to positively retain the carton with the clamping means.

5. Carton unloading apparatus as set forth in claim 4, including linkage means outwardly of said wall means for moving said piercing member between a first clearance position to allow a carton to be placed within the clamping means and a second carton piercing position wherein the piercing member is positioned inwardly of the sidewall of the carton.

6. Carton unloading apparatus as set forth in claim 5, wherein said linkage means includes a first link pivotally mounted on said wall means, and a second link pivotally connected to said first link outwardly of its pivotal connection to said wall means, said second link having a reversely bent outer end positioned in alignment with an opening in said wall means, so that upon rotation of said first link, said second link is moved between said first and second positions.

7. Carton unloading apparatus mechanism as set forth in claim 6, wherein a third link is pivotally connected to said first link on an opposite side of its pivotal connection to said wall means from said second link, said third link having a reversely bent outer end positioned in alignment with an opening in said wall means, so that upon rotation of said first link, said second and third links are moved between said first and second positions.

8. Carton unloading apparatus as set forth in claim 3, wherein said support means is defined by a flange extending inwardly from the lower end of said wall means.

9. Apparatus as set forth in claim 1, in which said layers of articles include plural stacks of nested containers; and further including stop means adjacent the lower end of said ramp means for initially retaining said stacks on said inclined ramp means; means for moving said stop means to a clearance position for releasing said stacks one at a time; stack transfer means having a plurality of sections; each section being adapted to receive a stack of containers therein; means mounting said stack transfer means for movement between a stack receiving position and a stack dispensing position for dispensing stacks of containers in said sections into hoppers that are each adapted to support a stack of containers; and stack transport means movable between the lower end of said inclined ramp and said stack transfer means for receiving stacks released by said stop means and for transporting the stacks one at a time from said inclined ramp to said transfer means.

10. A container supply mechanism as set forth in claim 9, including means for mounting said frame means for pivotal movement relative to a filling machine, and means on said frame means for releasably connecting said frame means to said filling machine.

11. A container supply mechanism as set forth in claim 9, including means for sensing the level of containers within said hoppers, and control means responsive to said sensing means for actuating means, transport means and transfer means.

12. A container supply mechanism as set forth in claim 9, including means for sensing the absence of stacks on said inclined ramp, and control means for actuating said elevator means in response to the absence of stacks on said inclined ramp.

13. A container supply mechanism as set forth in claim 9, in which said carton includes sheets at the upper and lower end thereof and between each of said layers; and wherein sheet removal means is provided on said frame for removing said sheets in response to upward movement of said elevator means.

14. A container supply mechanism as set forth in claim 13, including means responsive to placement of said carton on said carton supporting means for providing a portion of said sheet removing means to a clearance position.

15. A container supply mechanism as set forth in claim 13, including means responsive to removal of said carton from said carton supporting means for moving a portion of said sheet removing means to a clearance position 16. Carton unloading apparatus comprising: frame means; means for supporting a carton on said frame means adjacent a carton discharge station, said carton having an open top and an open bottom with a plurality of layers of articles being positioned between said top and bottom; an inclined ramp at said discharge station for receiving layers of articles successively discharged from said carton; stop means at the end of said discharge ramp for retaining articles on said ramp, said stop means and said ramp cooperating to form an article storage zone; means for moving said stop means from an article stopping position to a clearance position for dispensing articles one at a time from the end of said ramp; elevator means mounted on said frame means adjacent said discharge station; said elevator means including an ejector member that is movable through an open bottom of said carton and into engagement with the lowermost layer of articles in said carton upon actuation of said elevator means; means positioned to monitor the articles on said ramp for sensing demand for articles; and means responsive to said sensing means for actuating said elevator means to move said ejector member into engagement with the lowermost layer of articles to shift all of the layers of articles upwardly in said carton and to move the uppermost layer of articles outwardly of said carton through said open top.

17. Carton unloading apparatus comprising: frame means: means for supporting a carton on said frame means adjacent a carton discharge station; said carton having an open top and an open bottom with a plurality of layers of articles being positioned between said top and bottom, there being a sheet at upper and lower end of the carton and between each layer of articles in the carton; elevator means mounted in said frame means adjacent said discharge station, said elevator means including an ejector member that is movable through the open bottom of said carton and into engagement with the lowermost layer of articles in said carton upon actuation of said elevator means; means for sensing demand for articles; sheet removal means operable in response to actuation of said elevator means; and means responsive to said sensing means for actuating said elevator means to move said ejector member into engagement with the lowermost layer of articles to shift all of the layers of articles upwardly in said carton and to move the uppermost sheet into engagement with said removal means and to move the uppermost layer of articles outwardly of said carton through said open top.

18. Carton unloading apparatus as set forth in claim 17, wherein said sheet removal means includes a plurality of fingers having pointed lower ends adapted to dig into said sheets upon upward movement of said elevator means, and means mounting said fingers for movement as said elevator means moves upwardly to shift said sheets relative to said articles.

19. Carton unloading apparatus as set forth in claim 18, including powered roller means adjacent said fingers for receiving said sheets when they are moved relative to said articles by said fingers.

20. Carton unloading apparatus as set forth in claim 17, wherein said sheet removal means includes frame means, a shaft pivotally mounted in said frame means, at least one support arm connected at one end to said shaft, a sheet engaging finger extending downwardly from said support arm having a pointed lower end adapted to dig into a sheet and move the sheet outwardly as the layers of articles are moved upwardly relative to the finger, and powered roller means on said frame adjacent said finger for receiving a sheet therefrom and transporting it to a storage zone.

21. Carton unloading as set forth in claim 20, wherein said powered roller means includes an arm pivotally mounted on said frame means, a first powered roller rotatably mounted in the pivot of said arm, a second powered roller positioned in sheet feeding relationship with respect to said first powered roller, and a third powered roller on said arm outwardly of the pivot axis thereof for initially engaging said sheet and for feeding it toward said first and second powered rollers.

22. Carton unloading apparatus as set forth in claim 16, in which each of said articles is a stack of nested containers, and wherein stack transport means is provided for receiving stacks one at a time from said storage zone, said apparatus further including means for moving said transport means from a stack receiving position adjacent said storage zone to a plurality of stack discharging positions; a stack transfer member having a plurality of sections, each section being adapted to receive a stack of containers therein; and means for moving said stack transfer member from (1) a stack receiving position wherein each section of said transfer member corresponds to a discharging position into (2) a position for simultaneously dispensing the stack in each section into a container dispensing hopper associated with a multiline filling machine.

23. Apparatus as set forth in claim 22, including means for sensing a predetermined level of containers in said hoppers, and mans for actuating said stack transfer member moving means in response to actuation of said sensing means.

24. Apparatus as set forth in claim 22, wherein said transport means includes a stack of holding tray, and means for moving said tray between a stack receiving position adjacent the lower end of said ramp for receiving a stack when said stop member is in the clearance position and a stack dumping position adjacent said transfer member.

25. Apparatus as set forth in claim 24, wherein said tray moving means includes means for inverting said tray at said dumping position to dump the stack of containers in said tray into the transfer member.

26. Apparatus as set forth in claim 25, wherein said tray moving means includes means for locating said tray at different locations in said dumping position for dumping the stacks into the different sections of said transfer member.

* * * * *

UNITED STATES PATENT OFFICE
CERTIFICATE OF CORRECTION

Patent No. 3,616,951  Dated November 2, 1971

Inventor(s) DAVID L. ST. CLAIR and MARTIN MUELLER  (Page 1)

It is certified that error appears in the above-identified patent and that said Letters Patent are hereby corrected as shown below:

"David L. St. Clari", one of the inventors, is misspelled and should be changed to read -- David L. St. Clair --.

Column 1, line 28, after "invention has" delete the word "a".

Column 2, line 23, after the word "detail" delete "in".

Column 2, line 62, add the word -- the -- before "openings".

Column 3, line 8, "resets" should read -- rests --.

Column 3, line 12, "side plate" should read -- side plates --.

Column 3, line 54, "include the" should read -- include threaded --.

Column 3, line 72, after the words "track means" add the number -- 68 --.

Column 4, line 17, "extends" should read -- extend --.

Column 4, line 54, "extend" should read -- extends --.

Column 5, line 8, "member 148" should read -- member 138 --.

Column 5, line 41, "shift" should read -- shaft --.

Column 5, line 75, after the words "on each" delete "of".

Column 6, line 2, after "one of" delete the second "of".

Column 6, line 66, after the word "In" add -- an --.

UNITED STATES PATENT OFFICE
CERTIFICATE OF CORRECTION

Patent No. 3,616,951          Dated November 2, 1971

Inventor(s) DAVID L. ST. CLAIR and MARTIN MUELLER    (Page 2)

It is certified that error appears in the above-identified patent and that said Letters Patent are hereby corrected as shown below:

Column 7, line 3, "if" should read -- of --.

Column 7, line 41, delete "much as".

Column 7, line 41, "portion" should read -- portions --.

Column 7, line 47, after "includes a" add the word -- bottom --

Column 7, line 69, "section" should read -- sections --.

Column 8, line 28, "can" should be -- cam --.

Column 8, line 48, after "both" add -- of --.

Column 9, line 32, "in" should read -- on --.

Column 9, line 44, "and" should read -- when --.

Column 9, line 53, "not" should read -- no --.

Column 9, line 64, "can" should read -- cam --.

Column 10, line 22, "contains" should read -- retains --.

Column 10, line 42, "if" should read -- of --.

Column 11, line 21, delete "mechanism".

Column 11, line 58, after "actuating" add -- said stop --.

Column 12, line 33, before "upper" add -- the --.

Column 12, line 60, "in" should read -- on --.

Column 14, line 3, after "stack" delete "of".

Signed and sealed this 25th day of April 1972.

(SEAL)
Attest:

EDWARD M. FLETCHER, JR.          ROBERT GOTTSCHALK
Attesting Officer                  Commissioner of Patents